United States Patent [19]
Shaughnessy et al.

[11] Patent Number: 5,392,449
[45] Date of Patent: Feb. 21, 1995

[54] RESOURCE MANAGEMENT BY AN INTELLIGENT REPEATER

[75] Inventors: Mark L. Shaughnessy, Algonquin; Lynn Monica, Chicago; Gary W. Grube, Palatine, all of Ill.

[73] Assignee: Motorola, Inc., Schaumburg, Ill.

[21] Appl. No.: 906,256

[22] Filed: Jun. 29, 1992

[51] Int. Cl.⁶ .................. H04B 1/74; H04B 3/36; H04B 17/02
[52] U.S. Cl. ........................... 455/8; 455/9; 455/34.1; 455/53.1; 379/63
[58] Field of Search ............. 455/54.1, 54.2, 34.1, 455/34.2, 53.1, 8, 9; 379/63

[56] References Cited

U.S. PATENT DOCUMENTS

| | | | |
|---|---|---|---|
| 4,570,261 | 2/1986 | Meher | 371/16.1 |
| 4,835,731 | 5/1989 | Nazarenko et al. | 379/58 |
| 4,903,321 | 2/1990 | Hall et al. | 455/8 |
| 4,905,302 | 2/1990 | Childress et al. | 455/34.1 |
| 4,939,746 | 7/1990 | Childress | 455/54.2 |
| 5,175,866 | 12/1992 | Childress et al. | 455/53.1 |
| 5,263,175 | 11/1993 | Dejmek | 455/54.1 |

FOREIGN PATENT DOCUMENTS 0436201 7/1991 European Pat. Off. .......... 455/8

OTHER PUBLICATIONS

E. F. Johnson, "Clearchannel Ltr®" Application Note, Copy Right 1988 by E. F. Johnson, pp. 2-1 through 2-8, Oct. 1988, 5th printing.

Primary Examiner—Reinhard J. Eisenzopf
Assistant Examiner—Mark D. Wisler
Attorney, Agent, or Firm—Susan L. Lukasik; Steven G. Parmelee; Wayne J. Egan

[57] ABSTRACT

In a trunked communication system using intelligent repeaters (101), each intelligent repeater performs a series of tests (602, 606, 610, 614, and 618) on its own functionality. The results of these tests are transmitted (622) to a resource manager, which is one of the intelligent repeaters at a communications site. Using the results of these tests, the resource manager then selects one or more of the intelligent repeaters to perform the functions of authorization, resource allocation (708), and logging of communications (713).

20 Claims, 6 Drawing Sheets

RESOURCE MANAGEMENT BY AN INTELLIGENT REPEATER

FIELD OF THE INVENTION

This invention relates to trunked communication systems, including but not limited to repeater control in a trunked communication systems. Reference is made to U.S. patent application Ser. No. 07/905,925, titled "Intelligent Repeater for Trunked Communications," filed on the same day as the present invention on behalf of Lynn Monica et al., with the same assignee as the present invention.

BACKGROUND OF THE INVENTION

Trunked communication systems are known to comprise a plurality of communication units, a limited number of communication resources that are transceived via a predetermined number of repeaters, or base stations, and a communication resource allocator that allocates the limited number of communication resources among the plurality of communication units. The communication units may be portable radios and/or mobile radios. The communication resources may comprise a TDM (time-division multiplexed) bus, a carrier frequency, a pair of carrier frequencies, or any RF (radio frequency) transmission means.

Generally, trunked two-way communication systems provide mobile and portable communication units with wireless services similar to many wired communication networks. Such examples include full-duplex telephone voice communication, two-way mobile-to-mobile group dispatch communication, and two-way mobile-to-dispatcher group dispatch communication. A typical trunked communication system site, where each different site has a different physical location, is composed of a number of full-duplex repeaters, each coupled to a variety of devices to support interconnection to the public telephone network, mobile-to-mobile calling, and to one or more dispatcher console positions. These devices typically provide a centralized control for the repeaters. For example, a single central controller provides radio channel signalling encode and decode functions, authorization functions, resource determination functions, and communication activity logging. A single telephone interconnect switch typically provides the repeaters with an interface to one or more telephone lines to support telephone interconnect communication. In systems employing a single device that is shared among the repeaters, a failure of the single device may render one or more of the desired services or functions inoperable, thus impairing communications in the system. Placing redundant devices within the system is expensive and an inefficient use of space and resources.

Because breaks in communications must be avoided, a method of providing centralized control of repeaters without wasteful redundancy is desired.

DESCRIPTION OF A PREFERRED EMBODIMENT

The following describes a method and apparatus that enables continuous service in a trunked communication system by eliminating the dependence on single shared devices for system control. Each of a plurality of intelligent repeaters is equipped with an arrangement of components that uniquely distribute these service functions. The functions of radio channel signaling encode and decode functions, authorization functions, resource determination functions, and communication activity logging are distributed among the repeaters such that function placement adaptation insures continued service operation.

Figure 1:
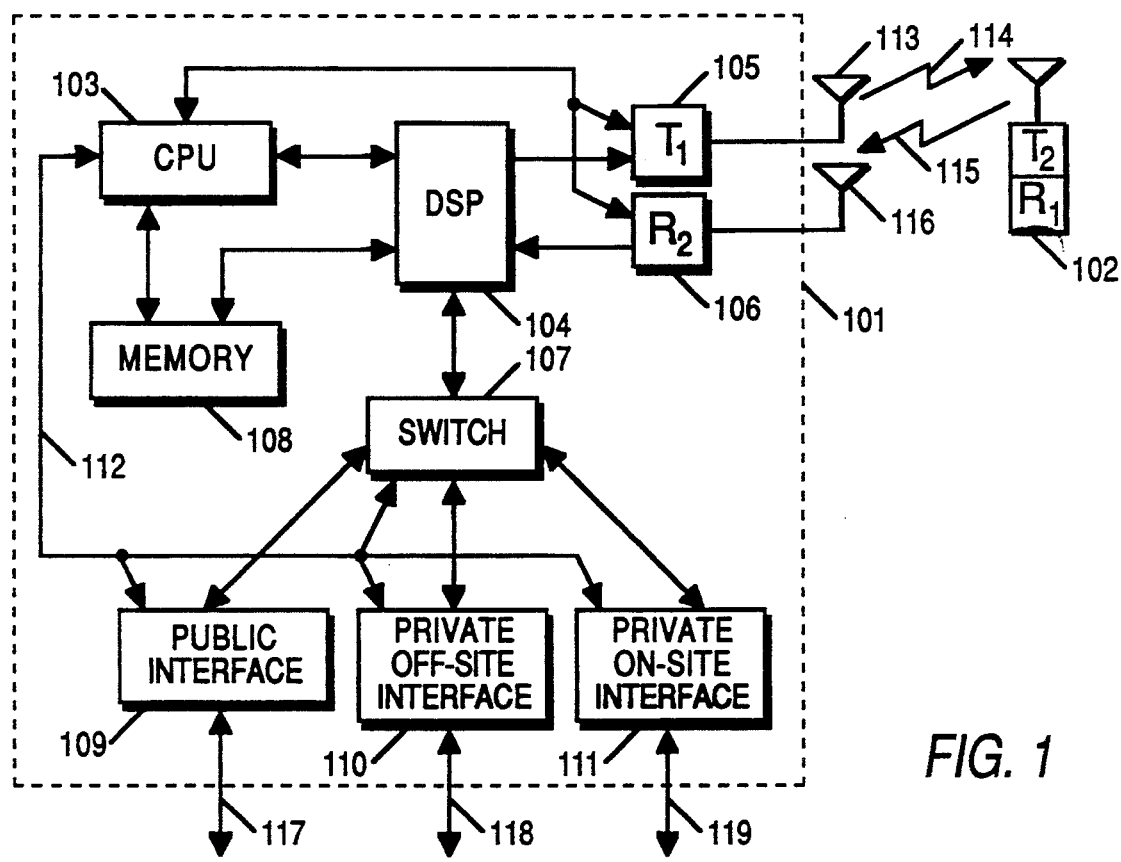
FIG. 1 is a block diagram of an intelligent repeater in a trunked communication system in accordance with the invention.

An intelligent repeater 101 and a communication unit 102 interact with radio frequency (RF) signals 114 and 115, as illustrated in FIG. 1. In the preferred embodiment, the intelligent repeater includes a transmitter 105, a receiver 106, a signal processor 104, a central processing unit (CPU) 103, memory 108 for storage of information, and a switch 107. Also included are interfaces for interfacing control information and processed signals directly to an external communication network. These interfaces include, for example, a public interface 117, a private off-site interface 118, and a private on-site interface 119.

RF signals 115 transmitted by the communication unit 102 are received by the receiver 106 of the intelligent repeater 101 through receive antenna 116. These transmissions may be modulated using a variety of techniques known in the art, such as, frequency modulation (FM), amplitude modulation (AM), or a combination of the two. Further, the signals carried by the modulation may be frequency and/or time division multiplexed. After reception, the signals are transferred to the signal processor 104, which may be a digital signal processor or DSP (e.g., a DSP56001 available from Motorola, Inc.), for further demodulation, decoding, and processing. Control information is extracted from the signal and transferred to the CPU 103, which may be a microprocessor (e.g., an MC68302 microprocessor available from Motorola, Inc.). Other information present in the signal such as voice, images, and user data are transferred to the switch 107, which may be a cross-point matrix, time slot interchanger, or multiple-access packet link for routing. The switch provides a means to transfer control signals and information signals between the radio channel, the public network, the private off-site network, and the private on-site local area network (LAN). The other information may also be transferred, if necessary, to memory 108, which may be random access memory (RAM), for temporary storage.

The extracted control information may contain such things as the communication unit's individual and group identifications (IDs), and type of service requested. The CPU 103 uses this information in a manner described in FIG. 3, FIG. 4, and FIG. 5 to allocate resources and communicate with other system elements in order to appropriately serve the communication unit 102. The memory 108 is also used by the CPU 103 during the normal course of its processing to store and retrieve control information and program steps, as those represented in FIG. 3, FIG. 4, FIG. 5, FIG. 6, and FIG. 7, system database information, and any dynamic parameters needed during program execution.

The switch 107, under control of the CPU 103, routes information from the signal processor 104 to one or more of the interfaces 109, 110, and 111. The content of the information and the configuration of the external network(s) determine to which interface(s) the information is routed. The public interface 109, if needed, is connected to one or more of many different public networks 117. The public interface 109 may be a standard telephone subscriber loop line, or it may be a standard data network line, such as one from an X.25 standard public packet data network. The private off-site interface 110, if needed, is typically connected to a private communications network 118 that is used to connect other sites of a multi-site radio network. The private off-site network 118 may be constructed of 4-wire analog lines, time division multiplex carriers, packet data links, and so forth. The private on-site interface 111 is connected to a LAN 119 that forms a communication link shared by other intelligent repeaters of the system that are located at the same communication site, i.e., the same physical space where the intelligent repeaters are located. The LAN 119 that the private on-site interface 111 is connected to may be a standard LAN, such as a LocalTalk LAN, an Ethernet LAN, or FDDI (Fiber-Optic Distribution Data Interconnect) LAN.

The switch 107 is also used to route information that flows into the intelligent repeater 101 from the interfaces 109, 110, and 111, to the signal processor 104. These signals are then processed by the signal processor 104 and transferred to the transmitter 105, where they are transmitted to the communication unit 102 through a transmit antenna 113. The RF signal 114 that is transmitted to the communication unit 102 may be modulated using any of the modulation techniques described above.

Some signals to and from the interfaces 109, 110, and 111 may be transferred directly between the interfaces 109, 110, and 111 and the CPU 103 using a control bus 112, which may be a multi-drop parallel data bus, serial data bus, or a time division multiplexed parallel or serial bus. In the preferred embodiment, each of the interfaces 109, 110, and 111 contains a microprocessor (e.g., an MC68302 microprocessor) that monitors the signal flow and determines whether the signals should be transferred to the CPU 103 or to the signal processor 104 via the switch 107.

Figure 2:
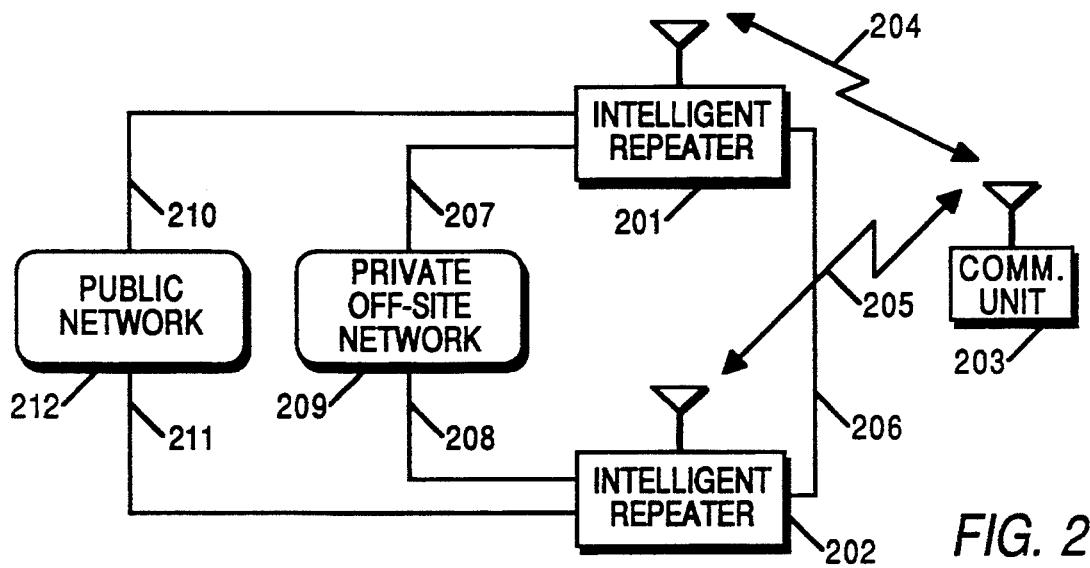
FIG. 2 is a diagram of an intelligent repeater in a trunked communication system with public network and private off-site network interfaces in accordance with the invention.

Intelligent repeaters 201 and 202 and their communication with one or more communication units 203 is illustrated in FIG. 2. In a trunked radio system, there may be one or more intelligent repeaters 201 and 202 located at one or more physical locations or sites. The number of intelligent repeaters needed per location is based on the required capacity of the sum of the interfaces provided in terms of radio channel and external network interfaces. The locations of sites are chosen based on the desired RF coverage of a particular geographical area.

Communication between intelligent repeaters 201 and 202 is necessary to enable the repeaters to operate in concert to provide consistent services. This communication is provided by assigning each component of the call establishment process to the communication unit(s) 203, because those units roam throughout the RF coverage area. For example, a particular intelligent repeater at a site may be dedicated to transceiving control information to and from the communication unit(s) 203. This particular repeater is considered to provide the "control channel," a term well known in the art. Other intelligent repeaters may be present at the site to be used for transceiving the typical voice, data, or image messages to and from the communication units 203. When a communication unit 203 makes a request for service on the control channel, that information is passed via the private on-site network 206 to the other intelligent repeaters 201 and 202 at the site for request authentication and appropriate resource allocation in accordance with the methods described below. As a second example, when a communication unit 203 roams from the coverage area of one site into the coverage area of another, information is passed via the private off-site network 209 using communication links 207 and 208 such that appropriate resources may be placed into service at the new site, while the resources that were in service at the old site are deactivated. As a third example, a communication unit 203 may request a telephone interconnect call. To connect this type of service to the communication unit 203, the intelligent repeater that is transceiving the communication unit's RF signal 204 is typically connected directly into the public telephone network 212 via a standard telephone line 211.

Figure 3:
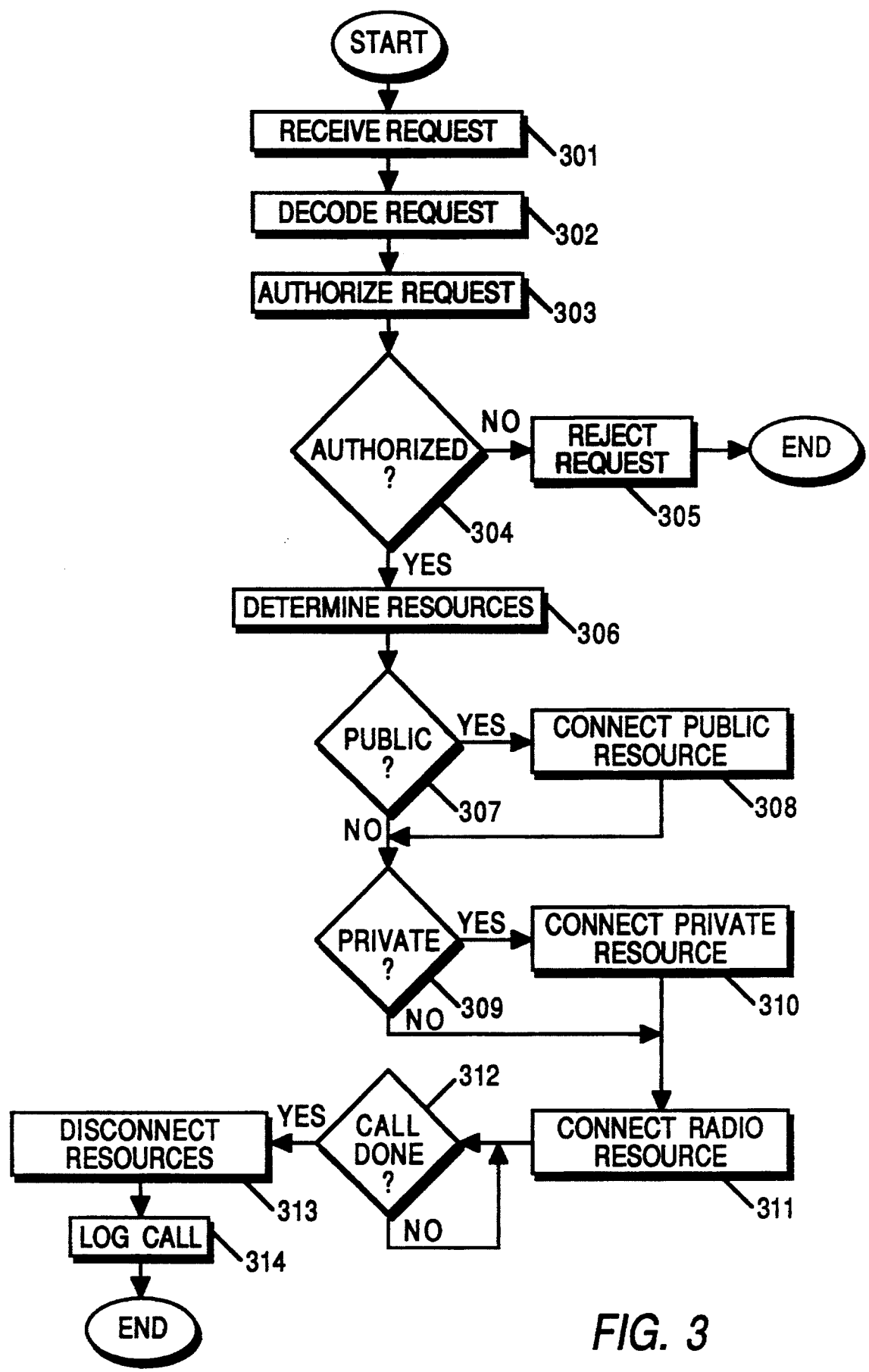
FIG. 3 is a flowchart showing operation of a trunked communications system using a single intelligent repeater in accordance with the invention.

A flowchart depicting operation of a trunked communications system using a single intelligent repeater is shown in FIG. 3. The intelligent repeater receives a request for service from a communication unit at step 301. The intelligent repeater decodes the request at step 302 using the signal processor 104 and CPU 103 to determine what type of service is required by the communication unit. The request is authorized at step 303 by scanning a list stored in memory and comparing the ID of the communication unit sourcing the resource request to the stored list, which is a predetermined list of authorized IDs and the resources each ID may access, as different communication units may be authorized to use only certain communication resources. If the communication unit that sourced the request is not authorized for the requested communication resource, the request is rejected at step 305, which entails transmitting a rejection message to the requesting communication unit, and the processing ends for this call request.

If at step 304 the communication unit that sourced the request is authorized to use the requested communication resources, the appropriate resources needed to service the request are determined at step 306. If at step 307 the resource required is a public resource, the public interface is connected to the public resource via the switch 107 at step 308. If at step 309 the resource required is a private off-site resource, the private off-site interface is connected via the switch 107 at step 310. The radio transceiver, transmitter 105 and receiver 106, in the intelligent repeater, operably coupled to the signal processor 104, is also connected via the switch 107 at step 311, and processed signals are transferred between the communication unit and the requested resources, thus communications occur.

These connections remain until the completion of the call at step 312, when the resources are disconnected at step 313 by deactivating the interfaces and stopping the transfer of processed signals through the switch 107. The call is logged at step 314 by storing information such as the communication unit's individual and/or talkgroup IDs, the duration of the call, and the types of resources used.

Figure 4:
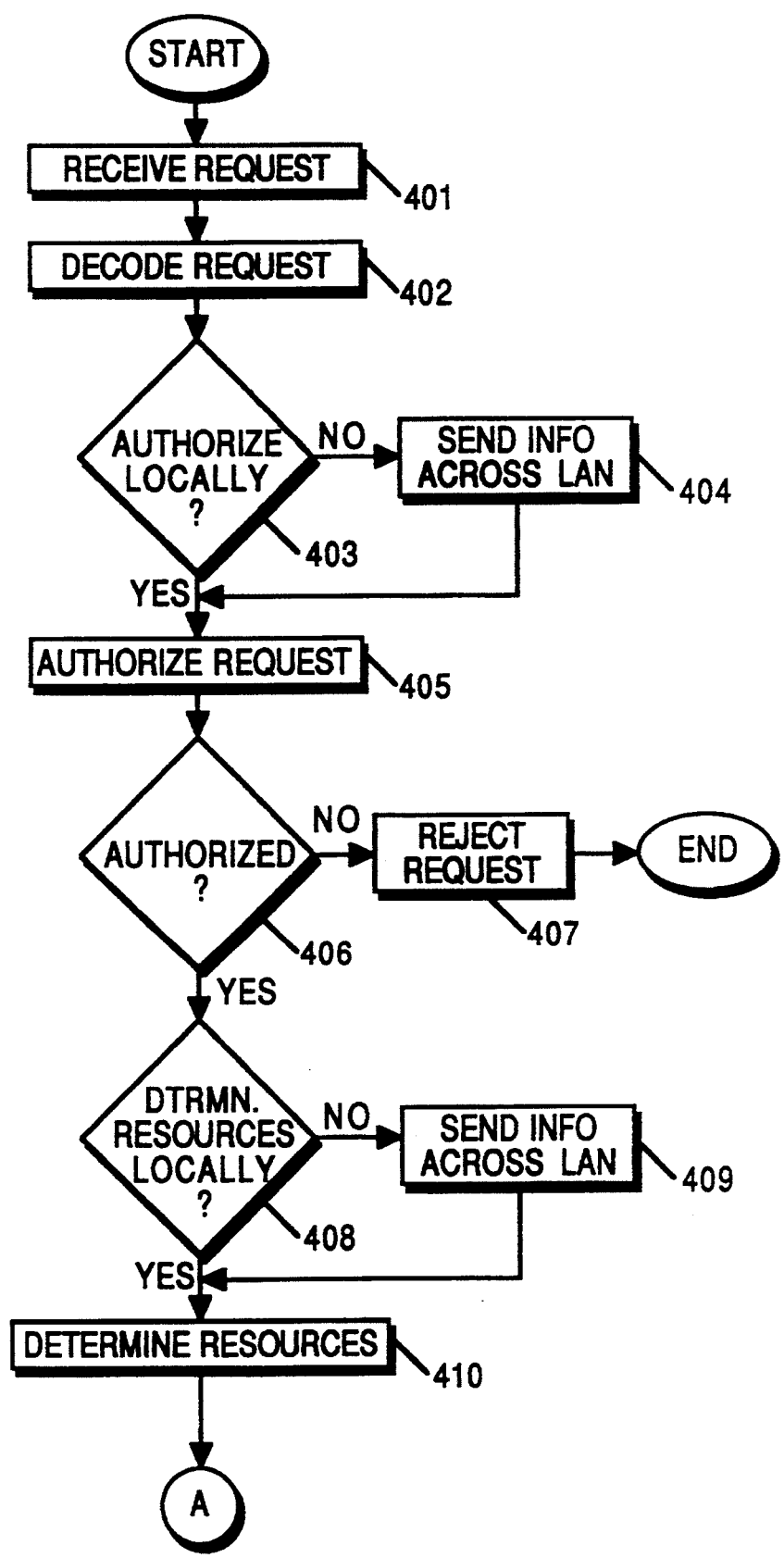
FIG. 4 and FIG. 5 depict a flowchart showing operation of a trunked communications system using multiple intelligent repeaters in accordance with the invention.
Figure 5:
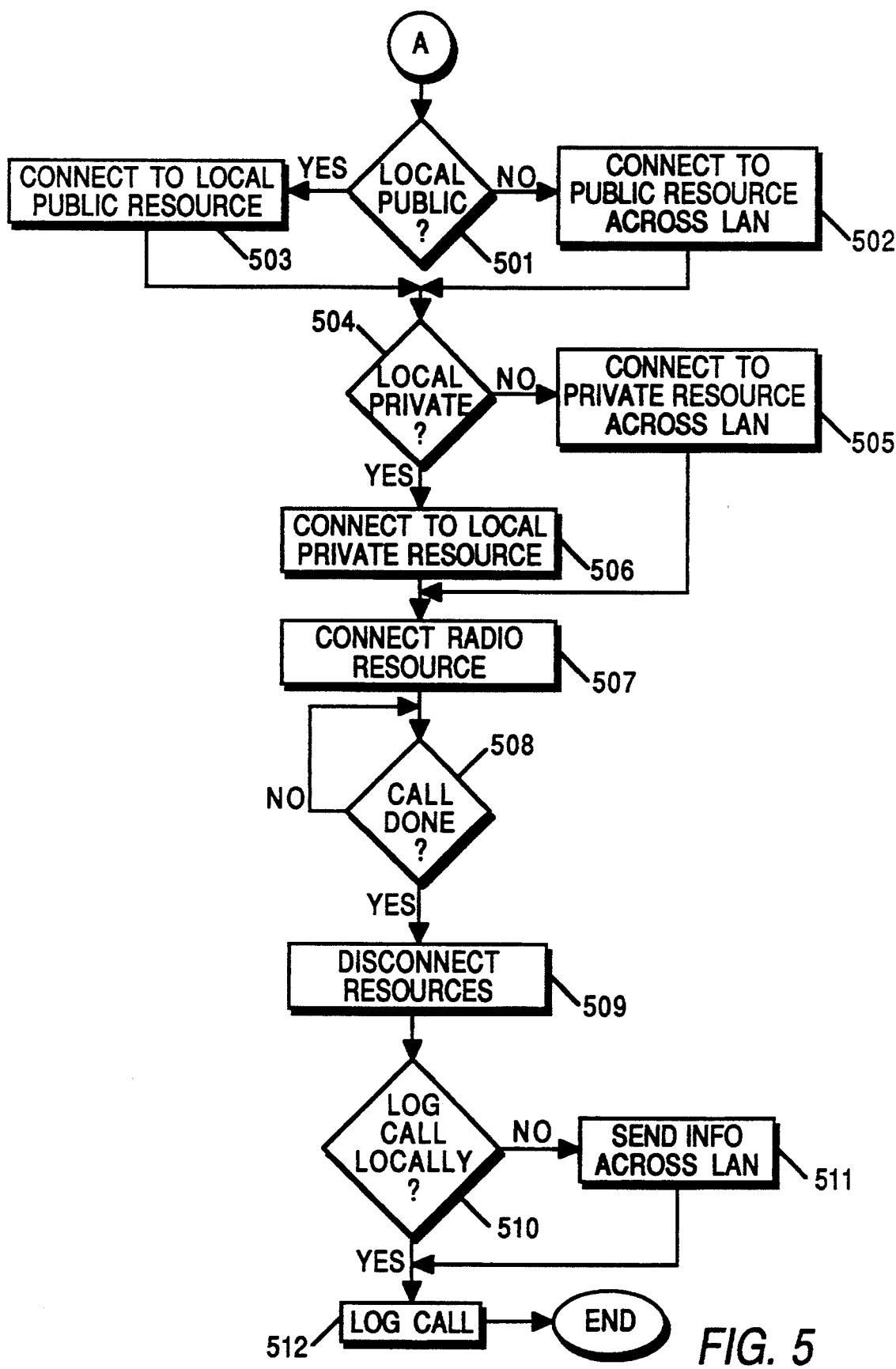

A flowchart depicting operation of a trunked communications system using multiple intelligent repeaters at a trunked communication site is shown in FIG. 4 and FIG. 5. An intelligent repeater supporting control channel communications, where resource requests are received from communications units and resource grants and transmitted in response, receives a resource request from a communication unit at stop 401. In the preferred embodiment, the communication unit encodes the information in the resource request with an error control coding method to provide reliable operation in the RF environment. The intelligent repeater supporting the control channel operations decodes 402 the information in the requesting transmission. The request information contains an ID of the requesting communication unit and also indicates what type of service is requested.

The present invention enables the distribution of the component tasks of the call establishment process. Accordingly, the intelligent repeater supporting the control channel operations decides which of the intelligent repeaters will authorize access for the communication resource request at step 403. Each intelligent repeater has a list of which intelligent repeater is assigned to carry out each component of the call establishment process so that each step is directed to the appropriate intelligent repeater. The appropriate intelligent repeater is either the same repeater, the local choice, or another intelligent repeater. If the authorization function is carried out by another of the intelligent repeaters, then the request information is transmitted via the private on-site interface over the site LAN to the intelligent repeater that will carry out the authorization at stop 404. At stop 405, the intelligent repeater assigned to carry out the authorization compares the identity of the requesting communication unit against a predetermined list of authorized communication unit IDs at step 405, as was previously described. If at stop 406 the requesting communication unit's ID is not authorized for access, the request is rejected at step 407, which entails transmitting a rejection message to the requesting communication unit, and the processing ends for this call request.

If at step 406 the requesting communication unit is authorized for access, the intelligent repeater supporting the control channel operations establishes at step 408 which of the intelligent repeaters will determine required communication resources to fulfill the communication resource request. The appropriate intelligent repeater is either the same repeater, the local choice, or another intelligent repeater. If the resource determination function is carried out by another of the intelligent repeaters, then the request information is transmitted via the private on-site interface over the site LAN to the intelligent repeater that will carry out the resource determination at stop 409. At stop 410, the intelligent repeater assigned to carry out the resource determination analyzes what resources are required by looking at the type of service requested and matching it against a predetermined list of resources required for that service and checking if the resource(s) is available for that type of call, and the process continues with stop 501 of FIG. 5. A radio channel resource is chosen to serve the requesting communication unit.

The intelligent repeater providing the radio channel resource may also be interconnected to the public telephone network and/or to a private network to establish the desired service. Depending on the availability of the public interface and private off-site interface locally associated with the intelligent repeater, the interconnect may be routed through the private on-site interface to the LAN and to another on-site intelligent repeater with an available public network or private off-site network resource. In this way, the distributed resources of the plurality of intelligent repeaters at the trunked communication site are utilized to maintain communications at all times.

The intelligent repeater supporting resource allocation decides whether public and private network resources are to be used, and if so, whether the resources are local or non-local. At stop 501, the public resource being assigned locally is considered. If at step 501 the public network interface is not available within the same intelligent repeater, then a connection is made at step 502 through the on-site LAN to an on-site intelligent repeater with an available public network resource (interface 109). If at step 501 the local public network interface is available, it is connected within the same intelligent repeater at step 503.

At step 504, the off-site private resource being assigned locally is considered. If at step 504 the off-site private network interface to an off-site private resource is not available within the same intelligent repeater, then a connection is made through the on-site LAN to an on-site intelligent repeater with an available off-site private network resource at step 505. If at step 504 the local off-site private network interface is available, it is connected within the same intelligent repeater at step 506.

The network interfaces chosen and assigned are connected at step 507 to the chosen radio resource, such as a frequency-pair channel to complete the requested call which transfers processed signals. Processed signals may be voice, data, and image information carried in any one of many formats by different physical media.

The intelligent repeater tests to see if the call is done at step 508. When the call is completed, the communication unit transmits a call end signal that is detectable by the intelligent repeater that provided the resources. The resources allocated to the call are disconnected by stopping the transfer of processed signals at step 509. At step 510, a decision is made where to log the call activity. Logging typically involves storing key statistics related to the call into the memory of the intelligent repeater. If the intelligent repeater that is assigned the logging function is not the intelligent repeater that provided the radio link, then the call information is passed to that logging intelligent repeater over the on-site LAN at step 511. The call information is logged into the memory of the appropriate intelligent repeater at step 512, and the process ends.

A network of distributed processing elements operates together when each element has been assigned a particular task related to the overall objective. In a trunked communication system site comprised of intelligent repeaters, each intelligent repeater may be capable of performing each component of the call establishment process, e.g., receiving a resource request over a radio channel, decoding the request, authorizing access, determining the required resources, connecting the resources, and logging the call summary. In the present invention, when a plurality of such intelligent repeaters comprise a trunked communication system, the components of the call establishment process may be distributed among the intelligent repeaters that are capable of each component task. Such an arrangement is desired to provide non-stop system operation in the event that one of the intelligent repeaters suffers a partial or complete failure. It is therefore desirable to determine the capabilities of these intelligent repeaters by testing the status of their associated major components. Taking into account the results of such status testing, an assignment of the call components may be carried out such that the combination of the intelligent repeaters work efficiently together to provide the desired communication services.

Figure 6:
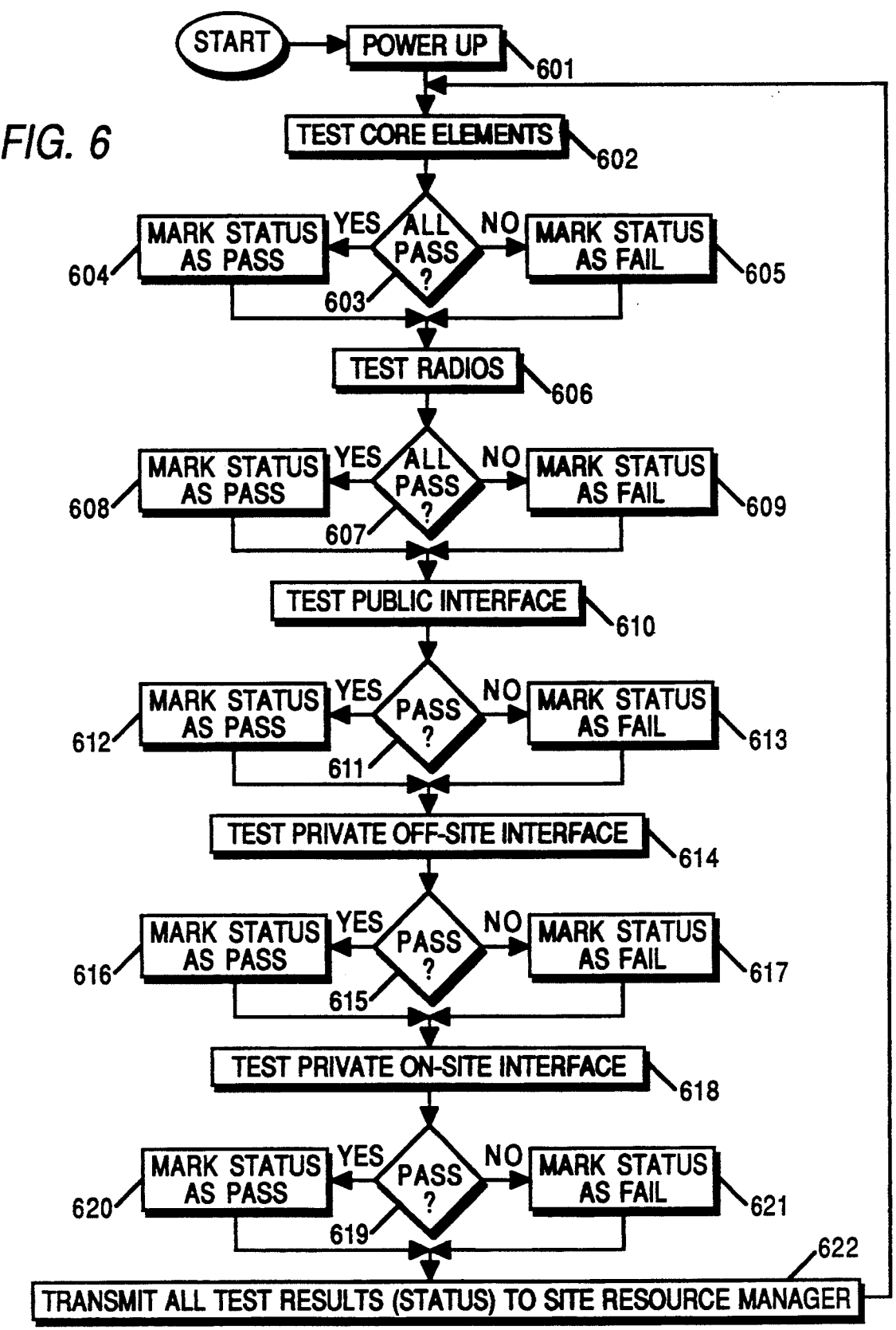
FIG. 6 is a flowchart showing testing of intelligent repeater functions in accordance with the invention.

A flowchart depicting the status testing operation of each intelligent repeater is shown in FIG. 6. The intelligent repeater powers up at step 601. Alternatively and/or additionally, this procedure could be activated on a demand basis in response to an status solicitation request from a device external to the intelligent repeater. The core elements are tested at step 602. The core elements of an intelligent repeater include the CPU 103, signal processor 104, memory 108, and switch 107. These core elements are critical to the operation of the intelligent repeater and are tested and their status summarized together as each must be operational in order that the intelligent repeater be assigned to any of the call establishment component tasks. Methods of testing each of these individual core elements are known in the art. The results of each test are checked to determine if all core elements passed at step 603. If all of the core elements pass their test, a status record in the memory is marked as pass at step 604. If one or more of the core elements fail its test, the status record is marked as fail at step 605.

At step 606, the status test of the radios (e.g., transmitter 105 and receiver 106) associated with the intelligent repeater is performed. Methods to individually test radio devices are known in the art. The radios or transceivers may operate at any frequency with any type of modulation and access method as supported by the CPU 103 and signal processor 104. The results of each test are checked to determine if all radios passed at step 607. If all of the radios passed, a status record in the memory is marked as pass at step 608. If one or more of the radios failed its test, the status record is marked as fail at step 609.

At step 610, a status test of the public network interface associated with the intelligent repeater is performed. Methods to individually test such interfaces are known in the art. The interface may be coupled to a public network by way of any one of many physical line types, e.g., a standard telephone subscriber loop line or a standard data network line. At step 611, the results of each test are checked to determine if the public network interface passed. If all of the public network interface tests pass, a status record in the memory is marked as pass at step 612. If one or more of the tests fail, the status record is marked as fail at step 613.

At step 614, a status test of the private off-site network interface associated with the intelligent repeater is performed. Methods to individually test such interfaces are known in the art. The interface may be coupled to a private off-site network by way of one of many physical line types, e.g., 4-wire analog lines, time division multiplex carriers, or packet data links. At step 615, the results of each test are checked to determine if the public network interface passed. If all of the private off-site network interface tests pass, a status record in the memory is marked as pass at step 616. If one or more of the tests fail, the status record is marked as fail at step 617.

At step 618, a status test of the private on-site network interface associated with the intelligent repeater is performed. Methods to individually test such interfaces are known in the art. The interface may be coupled to a private on-site network by way of one of many physical line types, e.g., a standard LAN, such as a LocalTalk LAN, an Ethernet LAN, or FDDI LAN. The results of each test are checked to determine if the private on-site network interface passed 619. If all of the private on-site network interface tests pass, a status record in the memory is marked as pass at step 620. If one or more of the tests fail, the status record is marked as fail at step 621.

After completion of testing and temporary storing of the results within the intelligent repeater performing the tests, the test results, or status information is transmitted at step 622 to the site resource manager, and the process continues with step 602 in order to keep the status information current. The site resource manager is a predetermined designation maintained by one of the intelligent repeaters at each communication site.

Figure 7:
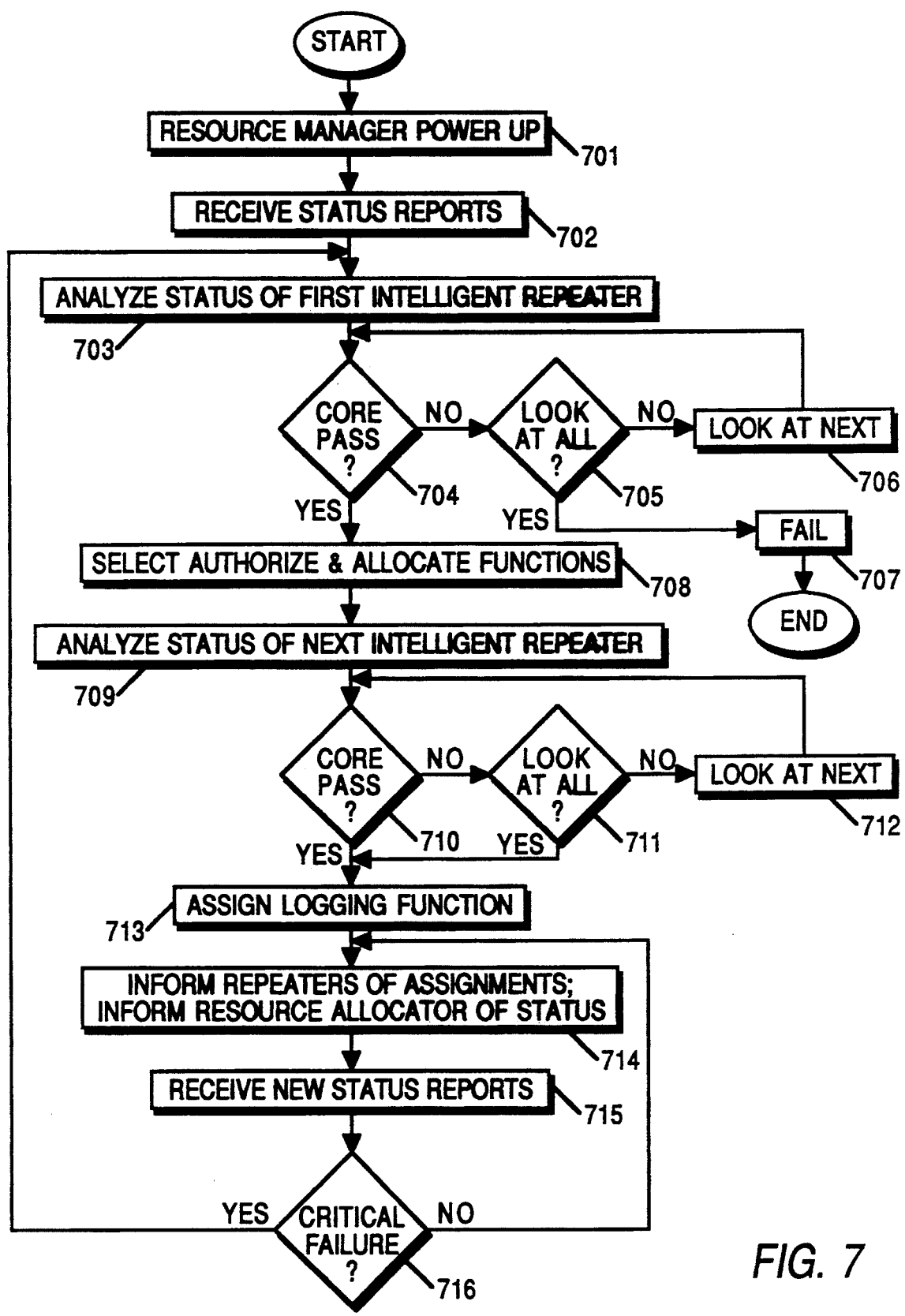
FIG. 7 is a flowchart showing distribution of system control functions amongst a plurality of intelligent repeaters in accordance with the invention.

A flowchart depicting the resource manager operation of an intelligent repeater is shown in FIG. 7. The resource management function is a process that runs in a CPU 103 of one of the intelligent repeaters at a trunked communication system site. At step 701, the resource manager powers up. The resource manager receives status information reports from each of the intelligent repeaters at step 702. In the preferred embodiment, the transmission of status information is carried over the private on-site LAN.

The resource manager analyzes the status of the first intelligent repeater at step 703. The status of the core element tests are checked to determine if all core elements passed at step 704. If there was no pass at step 705, and the resource manager has not looked at all of the intelligent repeaters' status reports at step 705, the resource manager checks the next intelligent repeater in the list at step 706. If all of the intelligent repeater status records have indicated failure of the core elements at steps 704 and 705, the site is non-operational and a failure condition is declared at step 707. Such a situation is highly unlikely and results in an alarm being triggered to notify the appropriate personnel. When an intelligent repeater is found, at step 704, to have passed all of its core element tests, that intelligent repeater is selected at step 708 to perform the authorization of access functions and resource allocation functions associated with establishing communication services.

The resource manager analyzes the status of the next intelligent repeater at step 709. The status of the core element tests are checked to determine if all core elements passed at step 710. If there was no pass at step 710, and the resource manager has not looked at all of the intelligent repeaters' status reports at step 711, the resource manager checks the next intelligent repeater in the list at step 712. When an intelligent repeater is found, at step 710, to have passed all of its core element tests, that intelligent repeater is selected at step 713 to perform logging functions associated with the establishing communication services. If all of the intelligent repeater status records have indicated failure of the core elements at steps 710 and 711, the intelligent repeater that was chosen to carry out authorization and resource allocation is also selected to carry out the logging function at step 713.

At step 714, the resource manager informs the intelligent repeaters of the assignment of authorize, allocation, and logging functions to the particular repeaters. Each intelligent repeater is thus able to route call establishment information to the proper intelligent repeater assigned to carry out each function of the call process. The resource manager also informs the resource allocation intelligent repeater of the status information associated with each of the intelligent repeaters at stop 714. The resource allocator is thus able to allocate communication resources from the available pool of site resources, such as radio channels, public network interfaces, or private off-site network interfaces.

New status information is received from each of the intelligent repeaters by the resource manager at step 715. Critical failure indications are checked at stop 716. If a critical failure occurs, such as a core element failure in an intelligent repeater assigned to the authorization, allocation, or logging functions, the analysis and selection process repeats from stop 703. If at stop 716 there is no critical failure, the process continues with stop 714.

When assigning intelligent repeaters to the authorize, resource allocation, and logging functions, the resource manager may assign all functions to one intelligent repeater, each function to a different repeater, or any combination in between. Because each repeater is capable of each control function, the resource manager is able to distribute the needed system functions throughout the system as needed, thus providing a highly flexible and reliable communication system. The flowchart of FIG. 7 does not reflect all of these many possibilities, for the sake of simplicity and brevity of the drawings. The resource manager may also assign other control functions not listed here.

What is claimed is:

1. A method of managing resources by a plurality of intelligent repeaters at a trunked communication site, comprising the steps of;
   receiving, by a resource manager of said trunked communication site, status information from the plurality of intelligent repeaters;
   analyzing said status information;
   selecting a first of the plurality of intelligent repeaters to perform authorization of access functions, which authorization includes comparing stored IDs that correspond to authorized communication units with IDs of requesting communication units;
   selecting a second of the plurality of intelligent repeaters, which second intelligent repeater is different than the first intelligent repeater, to perform resource allocation functions, which functions include determining communication resources that are to be used to service a requested communication;
   selecting a third of the plurality of intelligent repeaters, which third intelligent repeater is different than both the first and second intelligent repeater, to perform logging functions;
   informing the plurality of intelligent repeaters of said first, said second, and said third of the plurality of intelligent repeaters; and
   informing said second of the plurality of intelligent repeaters of said status information.

2. The method of claim 1, further comprising the steps of:
   receiving subsequent status information from the plurality of intelligent repeaters;
   analyzing said subsequent status information for a failure of any of said first, said second, and said third of the plurality of intelligent repeaters; and
   when said failure is found:
      selecting a fourth of the plurality of intelligent repeaters to perform authorization of access functions;
      selecting a fifth of the plurality of intelligent repeaters to perform resource allocation functions;
      selecting a sixth of the plurality of intelligent repeaters to perform logging functions;
      informing the plurality of intelligent repeaters of said fourth, said fifth, and said sixth of the plurality of intelligent repeaters; and
      informing said fifth of the plurality of intelligent repeaters of said status information.

3. The method of claim 1, wherein said status information is determined by a method comprising the steps of:
   testing functionality of at least one element of each intelligent repeater to produce test results; and
   transmitting said test results to said resource manager.

4. The method of claim 3, wherein said at least one element is comprised of one of a signal processor, a control information processor, and a storing means.

5. The method of claim 1, wherein said status information is determined by a method comprising the steps of:
   testing functionality of a transceiver for each of said plurality of intelligent repeaters to produce test results; and
   transmitting said test results to said resource manager.

6. The method of claim 1, wherein said status information is determined by a method comprising the steps of:
   testing functionality of a public communication network interface of each intelligent repeater to produce test results; and
   transmitting said test results to said resource manager.

7. The method of claim 1, wherein said status information is determined by a method comprising the steps of:
   testing functionality of a private off-site communication network interface of each intelligent repeater to produce test results; and
   transmitting said test results to said resource manager.

8. The method of claim 1, wherein said status information is determined by a method comprising the steps of:
   testing functionality of a private on-site communication network interface of each intelligent repeater to produce test results; and
   transmitting said test results to said resource manager.

9. The method of claim 1, wherein said status information is determined by a method comprising the steps of:
   testing functionality of at least one element of each intelligent repeater to produce a first test result; and
   testing functionality of a transceiver for each of said plurality of intelligent repeaters to produce a second test result; and
   testing functionality of a public communication network interface of each intelligent repeater to produce a third test result; and testing functionality of a private off-site communication network interface of each intelligent repeater to produce a fourth test result;

testing functionality of a private on-site communication network interface of each intelligent repeater to produce a fifth test result; and transmitting all of said test results to said resource manager.

10. The method of claim 9, wherein said at least one element is comprised of one of a signal processor, a control information processor, and a storing means.

11. A communication system that managing resources by a plurality of intelligent repeaters at a trunked communication site, the system comprising:

means for receiving, by a resource manager of said trunked communication site, status information from the plurality of intelligent repeaters;

means, responsive to said receiving means, for analyzing said status information;

means, responsive to said analyzing means, for selecting a first of the plurality of intelligent repeaters to perform authorization of access functions, which authorization includes comparing stored IDs that correspond to authorized communication units with IDs Of requesting communication units;

means, responsive to said analyzing means, for selecting a second of the plurality of intelligent repeaters, which second intelligent repeater is different than the first intelligent repeater, to perform resource allocation functions, which functions include determining communication resources that are to be used to service a requested communication;

means, responsive to said analyzing means, for selecting a third of the plurality of intelligent repeaters, which third intelligent repeater is different than both the first and second intelligent repeater, to perform logging functions;

means, responsive to each of said selecting means, for informing the plurality of intelligent repeaters of said first, said second, and said third of the plurality of intelligent repeaters; and means, responsive to each of said selecting means, for informing said second of the plurality of intelligent repeaters of said status information.

12. The communication system of claim 11, further comprising:

means for receiving subsequent status information from the plurality of intelligent repeaters;

means, responsive to said means for receiving subsequent status information, for analyzing said subsequent status information for a failure of any of said first, said second, and said third of the plurality of intelligent repeaters; and means, responsive to said failure, for selecting a fourth of the plurality of intelligent repeaters to perform authorization of access functions;

means, responsive to said failure, for selecting a fifth of the plurality of intelligent repeaters to perform resource allocation functions;

means, responsive to said failure, for selecting a sixth of the plurality of intelligent repeaters to perform logging functions;

means, responsive to each of said selecting means, for informing the plurality of intelligent repeaters of said fourth, said fifth, and said sixth of the plurality of intelligent repeaters; and means, responsive to each of said selecting means, for informing said fifth of the plurality of intelligent repeaters of said status information.

13. The communication system of claim 11, wherein said status information is determined by a method comprising:

means for testing functionality of at least one element of each intelligent repeater to produce test results; and means for transmitting said test results to said resource manager.

14. The communication system of claim 13, wherein said at least one element is comprised of one of a signal processor, a control information processor, and a storing means.

15. The communication system of claim 11, wherein said status information is determined by a method comprising:

means for testing functionality of a transceiver for each of said plurality of intelligent repeaters to produce test results; and means for transmitting said test results to said resource manager.

16. The communication system of claim 11, wherein said status information is determined by a method comprising:

means for testing functionality of a public communication network interface of each intelligent repeater to produce test results; and means for transmitting said test results to said resource manager.

17. The communication system of claim 11, wherein said status information is determined by a method comprising:

means for testing functionality of a private off-site communication network interface of each intelligent repeater to produce test results; and means for transmitting said test results to said resource manager.

18. The communication system of claim 11, wherein said status information is determined by a method comprising:

means for testing functionality of a private on-site communication network interface of each intelligent repeater to produce test results; and means for transmitting said test results to said resource manager.

19. The communication system of claim 11, further comprising:

means for testing functionality of at least one element of each intelligent repeater to produce a first test result; and means for testing functionality of a transceiver for each of said plurality of intelligent repeaters to produce a second test result; and means for testing functionality of a public communication network interface of each intelligent repeater to produce a third test result; and means for testing functionality of a private off-site communication network interface of each intelligent repeater to produce a fourth test result;

means for testing functionality of a private on-site communication network interface of each intelligent repeater to produce a fifth test result; and means for transmitting all of said test results to said resource manager.

20. The communication system of claim 19, wherein said at least one element is comprised of one of a signal processor, a control information processor, and a storing means.

* * * * *